United States Patent
Kasuga et al.

(10) Patent No.: US 9,839,869 B2
(45) Date of Patent: Dec. 12, 2017

(54) HONEYCOMB FILTER

(75) Inventors: Takafumi Kasuga, Ibi-gun (JP);
Misako Makino, Ibi-gun (JP);
Saiduzzaman Md, Ibi-gun (JP)

(73) Assignee: IBIDEN CO., LTD., Ogaki-shi (JP)

( * ) Notice: Subject to any disclaimer, the term of this patent is extended or adjusted under 35 U.S.C. 154(b) by 484 days.

(21) Appl. No.: 14/389,369

(22) PCT Filed: Mar. 30, 2012

(86) PCT No.: PCT/JP2012/058752
§ 371 (c)(1),
(2), (4) Date: Sep. 29, 2014

(87) PCT Pub. No.: WO2013/145323
PCT Pub. Date: Oct. 3, 2013

(65) Prior Publication Data
US 2015/0068176 A1    Mar. 12, 2015

(51) Int. Cl.
*B01D 39/14* (2006.01)
*B01D 39/20* (2006.01)
(Continued)

(52) U.S. Cl.
CPC ..... *B01D 46/2429* (2013.01); *B01D 46/2418* (2013.01); *B01D 46/2451* (2013.01);
(Continued)

(58) Field of Classification Search
CPC .............. F01N 3/0222; F01N 2330/06; F01N 2330/60; F01N 2510/00; B01D 46/2474;
(Continued)

(56) References Cited

U.S. PATENT DOCUMENTS

2005/0207946 A1    9/2005   Asano et al.
2008/0247918 A1*  10/2008   Ohno ................... B01D 46/247
                                                                    422/180
(Continued)

FOREIGN PATENT DOCUMENTS

JP    2005-296935    10/2005
JP    2007-130629     5/2007
(Continued)

OTHER PUBLICATIONS

International Search Report for corresponding International Application No. PCT/JP2012/058752, dated May 22, 2012.
(Continued)

*Primary Examiner* — Amber R Orlando
(74) *Attorney, Agent, or Firm* — Mori & Ward, LLP

(57) ABSTRACT

The honeycomb filter of the present invention comprises a ceramic honeycomb substrate formed from a porous body of sintered ceramic particles, and a filter layer formed on the surface of the cell walls, wherein a portion of the filter layer penetrates from the surface of the cell walls into pores formed by the ceramic particles to form inter-particle filtration bodies, these inter-particle filtration bodies are formed from a plurality of spherical ceramic particles and crosslinking bodies which bind the spherical ceramic particles to each other, and the spherical ceramic particles and the crosslinking bodies form a three-dimensional network structure.

13 Claims, 7 Drawing Sheets

(51) Int. Cl.
| | |
|---|---|
| *B01D 39/06* | (2006.01) |
| *B01D 50/00* | (2006.01) |
| *B01D 46/24* | (2006.01) |
| *C04B 41/85* | (2006.01) |
| *C04B 35/565* | (2006.01) |
| *C04B 37/00* | (2006.01) |
| *C04B 41/00* | (2006.01) |
| *C04B 41/50* | (2006.01) |
| *F01N 3/022* | (2006.01) |
| *C04B 35/626* | (2006.01) |
| *C04B 111/00* | (2006.01) |

(52) U.S. Cl.
CPC ........ *C04B 35/565* (2013.01); *C04B 35/6263* (2013.01); *C04B 37/005* (2013.01); *C04B 41/009* (2013.01); *C04B 41/5089* (2013.01); *C04B 41/85* (2013.01); *F01N 3/0222* (2013.01); *B01D 2046/2433* (2013.01); *B01D 2046/2481* (2013.01); *B01D 2046/2485* (2013.01); *B01D 2046/2492* (2013.01); *C04B 2111/00793* (2013.01); *C04B 2235/526* (2013.01); *C04B 2235/528* (2013.01); *C04B 2235/5224* (2013.01); *C04B 2235/5436* (2013.01); *C04B 2235/5445* (2013.01); *C04B 2235/5472* (2013.01); *C04B 2237/083* (2013.01); *C04B 2237/09* (2013.01); *C04B 2237/365* (2013.01); *F01N 2330/06* (2013.01); *Y02T 10/20* (2013.01)

(58) Field of Classification Search
CPC ... C04B 41/009; C04B 41/5089; C04B 41/85; C04B 2111/00793; Y02T 10/20
See application file for complete search history.

(56) References Cited

U.S. PATENT DOCUMENTS

| | | |
|---|---|---|
| 2009/0243150 A1 | 10/2009 | Koketsu |
| 2010/0011726 A1 | 1/2010 | Ishikawa |
| 2010/0126133 A1 | 5/2010 | Fekety et al. |

FOREIGN PATENT DOCUMENTS

| | | |
|---|---|---|
| JP | 2009-233938 | 10/2009 |
| JP | 2011-098336 | 5/2011 |
| WO | WO 2008/066167 | 6/2008 |
| WO | WO 2010/0110011 | 9/2010 |
| WO | WO 2011/125772 | 10/2011 |

OTHER PUBLICATIONS

Written Opinion for corresponding International Application No. PCT/JP2012/058752, dated May 22, 2012.
Extended European Search Report for corresponding EP Application No. 12873471.2-1354, dated Nov. 8, 2015.

* cited by examiner

Cross-sectional view along line A-A (a)

(b)

(a)

(b)

(c)

HONEYCOMB FILTER

TECHNICAL FIELD

The present invention relates to a honeycomb filter.

BACKGROUND ART

The exhaust gas discharged from internal combustion engines such as diesel engines contains particulate matter (hereafter also referred to as PM) such as soot and the like, and in recent years, the harm caused to people and the environment by this PM has become an issue. Furthermore, because the exhaust gas also contains harmful gas components such as CO, HC and $NO_x$, the effect of these harmful gas components on people and the environment is also a cause for concern.

Accordingly, in order to trap the PM in the exhaust gas and purge the harmful gas components, an exhaust gas cleaning device is used.

This type of exhaust gas cleaning device is prepared using a honeycomb filter composed of a material such as a ceramic. The exhaust gas can be cleaned by passing the exhaust gas through the honeycomb filter.

In a honeycomb filter used in an exhaust gas cleaning device to trap the PM in an exhaust gas, a multitude of cells separated by cell walls are disposed in parallel in the longitudinal direction, and each cell is sealed at one end section. Consequently, the exhaust gas that flows into a given cell necessarily passes through a cell wall that separates the cells, and then flows out of another cell. In other words, if this type of honeycomb filter is provided in an exhaust gas cleaning device, then the PM contained in the exhaust gas is captured by the cell walls as it passes through the honeycomb filter. Accordingly, the cell walls of the honeycomb filter function as a filter that cleans the exhaust gas.

In the initial stage of PM trapping by the honeycomb filter, the PM infiltrates the fine pores in the cell walls and is trapped inside the cell walls, generating a "depth filtration" state in which the fine pores in the cell walls are blocked. In this depth filtration state, PM continues to accumulate inside (the fine pores in) the cell walls. As a result, a problem can occur in that immediately after the trapping of PM begins, the effective porosity of the cell walls is reduced, causing the pressure loss to suddenly increase.

Patent Document 1 discloses a honeycomb filter in which a composite region is formed by depositing particles on the surface layer portions of the cell walls that constitute the honeycomb filter.

PRIOR ART DOCUMENTS

Patent Documents

Patent Document 1: WO 2010/110011 pamphlet

DISCLOSURE OF INVENTION

Problems Invention Aims to Solve

In the technology disclosed in Patent Document 1, the particles that are deposited in order to form the composite region (hereafter also referred to as a "filter layer" in the present description) are supplied and deposited by a gas-solid two phase flow.

The average particle size of the particles that are deposited to form the composite region is prescribed as 1 to 15 μm, and an example in which cordierite particles having an average particle size of 3 μm are supplied by a gas-solid two phase flow is described as a specific example.

In the honeycomb filter prepared in this example, it is thought that the particles having an average particle size of 3 μm are deposited uniformly across the entire surface layer of the cell walls.

The filter layer has a role of accumulating and trapping PM on the filter layer. Accordingly, pressure is applied to the filter layer by the exhaust gas introduced into the honeycomb filter. If this pressure applied to the filter layer by the exhaust gas is high, then in some cases a portion of the particles that constitute the filter layer may detach, resulting in loss of the filter layer.

The present invention has been developed in light of the above circumstances, and has an object of providing a honeycomb filter having a robust filter layer in which the particles are unlikely to detach.

Means for Solution of the Problems

In order to achieve the above object, a honeycomb filter according to a first aspect of the invention comprises:

a ceramic honeycomb substrate in which a multitude of cells through which a fluid flows are disposed in parallel in a longitudinal direction and are separated by cell walls, each cell being sealed at an end section at either the fluid inlet side or the fluid outlet side, and a filter layer which, among the surfaces of the cell walls, is formed on the surface of the cell walls of those cells in which the end section at the fluid inlet side is open and the end section at the fluid outlet side is sealed, wherein the ceramic honeycomb substrate is formed from a porous body of sintered ceramic particles, a portion of the filter layer penetrates from the surface of the cell walls into pores formed by the ceramic particles, thereby forming inter-particle filtration bodies, these inter-particle filtration bodies are formed from a plurality of spherical ceramic particles and crosslinking bodies which bind the spherical ceramic particles to each other by crosslinking the spherical ceramic particles, and the spherical ceramic particles and the crosslinking bodies form a three-dimensional network structure.

In the honeycomb filter described above, the ceramic honeycomb substrate is formed from a porous body of sintered ceramic particles, and pores are formed by the ceramic particles.

Further, the inter-particle filtration bodies which represent a portion of the filter layer penetrate into these pores formed by the ceramic particles.

Because the filter layer is formed so as to conform to the unevenness within the cell walls produced by the pores, an anchoring effect is obtained, so that detachment of the entire filter layer from the cell walls is prevented.

Furthermore, because the ceramic particles and the spherical ceramic particles which constitute the inter-particle filtration bodies are bound together, detachment of the filter layer from the cell walls is prevented.

Moreover, because the spherical ceramic particles which constitute the inter-particle filtration bodies are bound to other spherical ceramic particles by a plurality of crosslinking bodies, it is thought that thermal stress applied to the spherical ceramic particles is dispersed across the plurality of crosslinking bodies, making detachment of the filter layer unlikely.

Further, the inter-particle filtration bodies have a three dimensional network structure in which spherical ceramic particles are bound together by crosslinking bodies. When the spherical ceramic particles are bound together by crosslinking bodies, a robust structure is obtained in which the particles are bound strongly together.

In other words, the inter-particle filtration bodies have a robust structure in which the particles are bound together by crosslinking structures, and the inter-particle filtration bodies penetrate inside the cell walls via an anchoring effect, and therefore partial detachment of the particles that constitute the filter layer from the filter layer is prevented, and detachment of the entire filter layer from the cell walls in a single action is also prevented. Accordingly, the filter layer of the honeycomb filter described above can perform the role of trapping and accumulating PM over a long period of time.

In a honeycomb filter according to claim 2, the average pore size of the pores within the inter-particle filtration bodies is larger than the average particle size of the spherical ceramic particles.

The fact that the average pore size of the pores formed as a result of the formation of a three dimensional network structure is larger than the average particle size of the spherical ceramic particles indicates that the pores provided in the inter-particle filtration bodies are sufficiently large to enable the gas components within the exhaust gas to pass through the inter-particle filtration bodies.

In other words, a honeycomb filter is obtained in which any increase in the pressure loss caused by providing the inter-particle filtration bodies is small.

In a honeycomb filter according to a third aspect of the invention, the inter-particle filtration bodies penetrate 5 to 50 μm from the surface of the cell walls.

If the depth to which the inter-particle filtration bodies penetrate is less than 5 μm, then the anchoring effect whereby the inter-particle filtration bodies penetrate into the pores formed by the ceramic particles tends not to be sufficient. Further, if the depth to which the inter-particle filtration bodies penetrate exceeds 50 μm, then the filter layer penetrates too far into the cell walls, and there may be an undesirable increase in the pressure loss.

In a honeycomb filter according to claim 4, the average particle size of the spherical ceramic particles is from 0.2 to 1.2 μm. If the average particle size of the spherical ceramic particles is less than 0.2 μm, then there is a possibility that the spherical ceramic particles may penetrate into the interior (fine pores) of the cell walls and block the fine pores, causing the pressure loss to increase. On the other hand, if the average particle size of the spherical ceramic particles exceeds 1.2 μm, then because the spherical ceramic particles are too large, even if inter-particle filtration bodies are formed, the pore size of the inter-particle filtration bodies is large. Consequently, PM passes through the inter-particle filtration bodies and penetrates into the fine pores of the cell walls, causing a "depth filtration" state in which PM is trapped inside the cell walls, which increases pressure loss.

In a honeycomb filter according to claim 5, the average pore size of the pores within the inter-particle filtration bodies is from 0.2 to 1.2 μm.

If the average pore size of the pores within the inter-particle filtration bodies is less than 0.2 μm, then the pores provided within the inter-particle filtration bodies are small, and because it becomes difficult for the gas components within the exhaust gas to pass through the inter-particle filtration bodies, the pressure loss may sometimes increase.

If the average pore size of the pores within the inter-particle filtration bodies exceeds 1.2 μm, then because the pores are too large, there is a possibility that PM may pass through the inter-particle filtration bodies, causing "depth filtration" in which the PM penetrates into the fine pores of the cell walls.

In a honeycomb filter according to claim 6, the porosity of the ceramic honeycomb substrate is from 55 to 70%.

In a honeycomb filter having a comparatively high porosity of 55 to 70%, the gaps between the ceramic particles that constitute the cell walls are wide, and the particles that constitute the filter layer can readily penetrate between the ceramic particles that constitute the cell walls, and therefore this type of honeycomb filter is suited to penetration of the filter layer from the surface of the cell walls into the pores formed by the ceramic particles, thereby forming inter-particle filtration bodies.

Further, because the gaps between the ceramic particles that constitute the cell walls are wide and the pressure loss due to the cell walls themselves is low, even if the depth to which the inter-particle filtration bodies penetrate is great, the pressure loss does not become too high. As a result, a honeycomb filter can be obtained which has low pressure loss while exhibiting a favorable anchoring effect.

In a honeycomb filter according to claim 7, the spherical ceramic particles are heat-resistant oxide ceramic particles, and in a honeycomb filter according to claim 8, the heat-resistant oxide ceramic particles are at least one type selected from the group consisting of alumina, silica, mullite, ceria, zirconia, cordierite, zeolite and titania.

When the inter-particle filtration bodies are formed from a heat-resistant oxide, even if a regeneration process is performed to incinerate the PM, problems such as melting of the filter layer are unlikely to occur. As a result, a honeycomb filter having excellent heat resistance can be obtained.

In a honeycomb filter according to claim 9, the ceramic honeycomb substrate comprises silicon carbide or a silicon-containing silicon carbide.

Silicon carbide and silicon-containing silicon carbides have a high degree of hardness and an extremely high thermal decomposition temperature. As a result, the honeycomb filter becomes a honeycomb filter that exhibits excellent mechanical properties and heat resistance.

In a honeycomb filter according to claim 10, the cells that constitute the ceramic honeycomb substrate comprise large volume cells and small volume cells, wherein the cross-sectional area of a cross section perpendicular to the longitudinal direction of the large volume cells is larger than the cross-sectional area of a cross section perpendicular to the longitudinal direction of the small volume cells. As a result, compared with a honeycomb filter in which the cross-sectional areas of all the cells are the same, the filtration area is larger, and a larger amount of PM can be accumulated before a regeneration process is performed.

In a honeycomb filter according to claim 11, the shape of the cross section perpendicular to the longitudinal direction of the large volume cells is substantially octagonal, and the shape of the cross section perpendicular to the longitudinal direction of the small volume cells is substantially tetragonal. Consequently, the large volume cells and the small volume cells can easily be arranged with good symmetry, so that a honeycomb filter having excellent mechanical strength is obtained where distortion or the like is unlikely to occur.

In a honeycomb filter according to claim 12, the shape of the cross section perpendicular to the longitudinal direction of the large volume cells is substantially tetragonal, and the shape of the cross section perpendicular to the longitudinal direction of the small volume cells is substantially tetragonal.

As a result, the large volume cells and the small volume cells which constitute the honeycomb calcined body can easily be arranged with good symmetry, so that a honeycomb filter having excellent mechanical strength is obtained where distortion or the like is unlikely to occur.

In a honeycomb filter according to claim 13, the shape of the cross section perpendicular to the longitudinal direction of the large volume cells is substantially hexagonal, and the shape of the cross section perpendicular to the longitudinal direction of the small volume cells is substantially hexagonal.

In other words, a honeycomb filter of the present invention is as described below.

1. A honeycomb filter, comprising:
a ceramic body having a plurality of through holes extending in parallel in a longitudinal direction of the ceramic body and a plurality of cell wall portions partitioning the through holes, the plurality of through holes forming a plurality of inlet cells sealed at an outlet end of the ceramic body and a plurality of outlet cells sealed at an inlet end of the ceramic body such that the plurality of cell wall portions is configured to filter a fluid flowing from the inlet cells into the outlet cells,
wherein the ceramic body has a plurality of auxiliary filter layers comprising a ceramic material and formed on surfaces of the cell wall portions in the inlet cells, respectively, and the cell wall portions in the inlet cells have transitional filter portions comprising three-dimensional network structures formed of the ceramic material of the auxiliary filter layers, and each of the three-dimensional network structures has a plurality of particulate ceramic portions and a plurality of linking ceramic portions linking the particulate ceramic portions.

2. The honeycomb filter according to claim 1, wherein the plurality of auxiliary filter layers is obtained by forming on the surfaces of the cell wall portions in the inlet cells three-dimensional network structures comprising a plurality of primary ceramic particles and a plurality of secondary ceramic particles having average particle diameters smaller than average particle diameters of the primary ceramic particles and sintering the three-dimensional network structure such that the plurality of auxiliary filter layers having the three-dimensional network structures having the particular ceramic portions and the linking ceramic portions linking the particular ceramic portions is formed on the surfaces of the cell wall portions in the inlet cells, respectively.

3. The honeycomb filter according to claim 1, wherein the particular ceramic portions have an average particle diameter which is greater than an average width of the linking ceramic portions.

EMBODIMENTS FOR CARRYING OUT THE INVENTION

A more detailed description of embodiments of the present invention is provided below. However, the present invention is not limited to the embodiments described below, and various modifications can be made without departing from the scope of the present invention.

(First Embodiment)

An embodiment of a honeycomb filter of the present invention is described below as a first embodiment.

In a honeycomb filter according to the first embodiment of the present invention, a ceramic honeycomb substrate (ceramic block) is composed of a plurality of honeycomb calcined bodies. Further, the multitude of cells of the honeycomb calcined bodies that constitute the honeycomb filter include large volume cells and small volume cells, and the area of a large volume cell in a cross section perpendicular to the longitudinal direction is larger than the area of a small volume cell in a cross section perpendicular to the longitudinal direction.

The honeycomb filter according to the first embodiment of the present invention has a filter layer formed on the surface of the cell walls of the ceramic honeycomb substrate comprising the honeycomb calcined bodies.

In this description, a structure without a filter layer formed on the surface of the cell walls is referred to as a "ceramic honeycomb substrate", and a structure with a filter layer formed on the surface of the cell walls is referred to as a "honeycomb filter", thereby distinguishing between the two.

Furthermore, in the following description, references which simply mention a cross section of a honeycomb calcined body indicate a cross section perpendicular to the longitudinal direction of the honeycomb calcined body. Similarly, references which simply mention the cross-sectional area of a honeycomb calcined body indicate the area of a cross section perpendicular to the longitudinal direction of the honeycomb calcined body.

Figure 1:
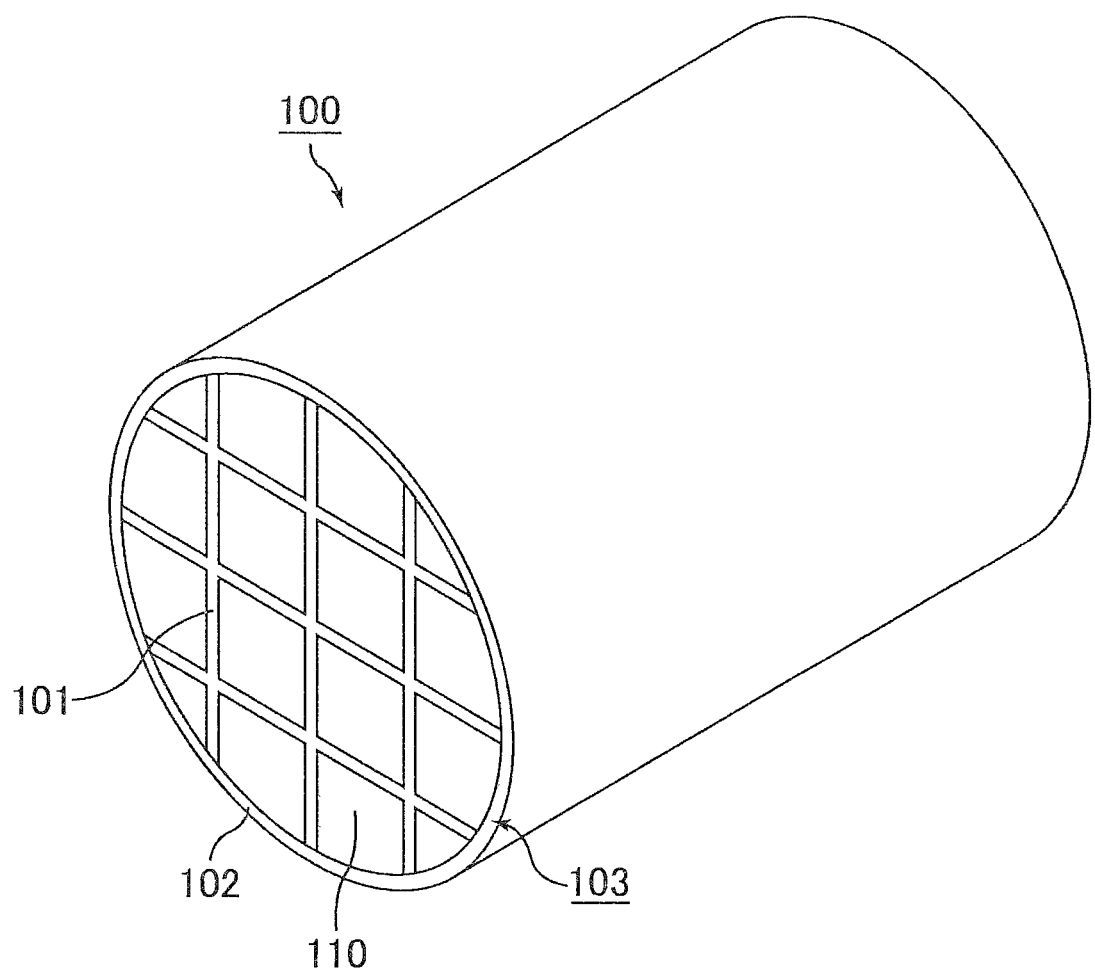
FIG. 1 is a perspective view schematically illustrating an example of a honeycomb filter according to a first embodiment of the present invention.

FIG. 1 is a perspective view schematically illustrating an example of the honeycomb filter according to the first embodiment of the present invention.

Figure 2:
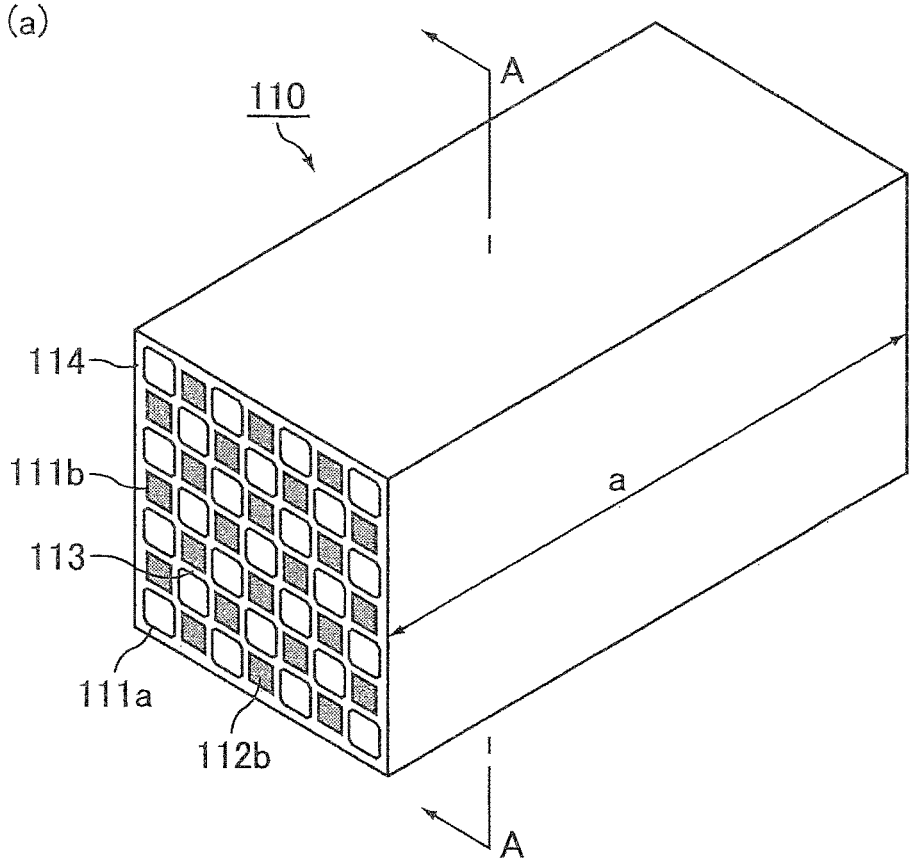
FIG. 2(a) is a perspective view schematically illustrating an example of a honeycomb calcined body that constitutes the honeycomb filter illustrated in FIG. 1.
FIG. 2(b) is a cross-sectional view along the line A-A of the honeycomb calcined body illustrated in FIG. 2(a).
Figure 2:
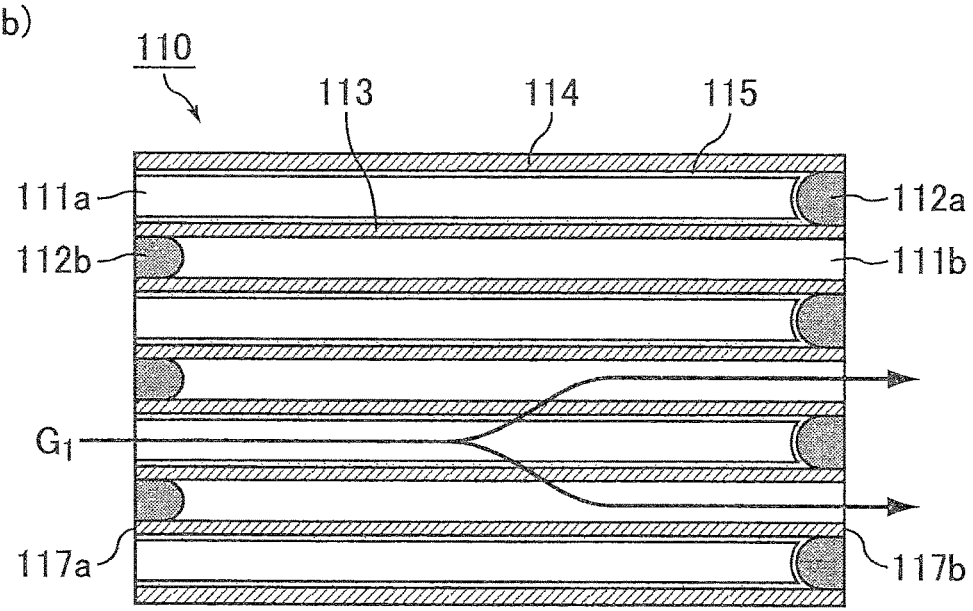

FIG. 2(a) is a perspective view schematically illustrating an example of a honeycomb calcined body that constitutes the honeycomb filter illustrated in FIG. 1. FIG. 2(b) is a cross-sectional view along the line A-A of the honeycomb calcined body illustrated in FIG. 2(a).

In the honeycomb filter 100 illustrated in FIG. 1, a plurality of honeycomb calcined bodies 110 are bundled together via adhesive material layers 101 to form a ceramic honeycomb substrate (ceramic block) 103, and an outer periphery coating layer 102 for preventing leakage of the exhaust gas is formed around the outer periphery of this ceramic honeycomb substrate (ceramic block) 103. The outer periphery coating layer may be formed as needed.

This type of honeycomb filter formed by bundling a plurality of honeycomb calcined bodies is also called an aggregated type honeycomb filter.

Although described in more detail below, the honeycomb calcined bodies 110 which constitute the honeycomb filter 100 are preferably porous bodies formed from silicon carbide or a silicon-containing silicon carbide.

The porosity of the honeycomb calcined bodies which constitute the honeycomb filter according to this embodiment of the present invention is not particularly limited, but is preferably from 55 to 70%.

In a honeycomb filter having a comparatively high porosity of 55 to 70%, the particles that constitute the filter layer can readily penetrate between the ceramic particles that constitute the cell walls, and therefore this type of honeycomb filter is suited to penetration of the filter layer from the surface of the cell walls into the pores formed by the ceramic particles, thereby forming inter-particle filtration bodies.

In the honeycomb calcined body 110 illustrated in FIG. 2(a) and FIG. 2(b), a multitude of cells 111a and 111b are disposed in parallel in the longitudinal direction (the direction of arrow a in FIG. 2(a)) and are separated by cell walls 113, and an outer peripheral wall 114 is formed at the outer periphery. One end section of each of the cells 111a and 111b is sealed by a sealing material 112a or 112b.

As illustrated in FIG. 2(b), a filter layer 115 is formed on the surface of the cell walls 113 of the honeycomb calcined body 110. The filter layer 115 is not shown in the honeycomb calcined body 110 illustrated in FIG. 2(a).

In the honeycomb calcined body 110 illustrated in FIG. 2(a) and FIG. 2(b), large volume cells 111a having a cross-sectional area perpendicular to the longitudinal direction that is relatively larger than that of small volume cells 111b, and small volume cells 111b having a cross-sectional area perpendicular to the longitudinal direction that is relatively smaller than that of the large volume cells 111a are arranged alternately.

The shape of the large volume cells 111a in a cross section perpendicular to the longitudinal direction is substantially octagonal, whereas the shape of the small volume cells 111b in a cross section perpendicular to the longitudinal direction is substantially tetragonal.

In the honeycomb calcined body 110 illustrated in FIG. 2(a) and FIG. 2(b), the end sections of the large volume cells 111a on a first end surface 117a side of the honeycomb calcined body 110 are open, and the end sections on a second end surface 117b side are sealed by the sealing material 112a. On the other hand, the end sections of the small volume cells 111b on the second end surface 117b side of the honeycomb calcined body 110 are open, and the end sections on the first end surface 117a side are sealed by the sealing material 112b.

Accordingly, as illustrated in FIG. 2(b), an exhaust gas $G_1$ introduced into a large volume cell 111a (in FIG. 2(b), the exhaust gas is indicated by $G_1$, and the flow of the exhaust gas is indicated by the arrows) necessarily flows out from a small volume cell 111b after passing through the cell wall 113 that separates the large volume cell 111a from the small volume cell 111b. Because the PM and the like in the exhaust gas $G_1$ is trapped when the exhaust gas $G_1$ passes through the cell wall 113, the cell walls 113 that separate the large volume cells 111a and the small volume cells 111b function as filters.

In this manner, gases such as exhaust gases can be passed through the large volume cells 111a and the small volume cells 111b of the honeycomb calcined body 110. When a gas such as an exhaust gas is introduced in the direction illustrated in FIG. 2(b), the end section on the first end surface 117a side of the honeycomb calcined body 110 (the end section where the small volume cells 111b are sealed) is called the fluid inlet side end section, and the end section on the second end surface 117b side of the honeycomb calcined body 110 (the end section where the large volume cells 111a are sealed) is called the fluid outlet side end section.

In other words, the large volume cells 111a in which the end section at the fluid inlet side is open can be called fluid inlet side cells 111a, and the small volume cells 111b in which the end section at the fluid outlet side is open can be called fluid outlet side cells 111b.

The filter layer and the inter-particle filtration bodies are described below.

FIG. 3(a) is an electron microscope photograph of a cross section which includes the cell wall, the filter layer and the inter-particle filtration bodies of the honeycomb filter. FIG. 3(b) is a photograph clearly indicating the inter-particle filtration bodies and the like in FIG. 3(a).

FIG. 3(a) and FIG. 3(b) show the cell wall formed from a porous body produced by sintering the ceramic particles which constitute the cell wall, the filter layer formed on the surface of the cell wall, and the inter-particle filtration bodies that have penetrated into the pores formed by the ceramic particles.

Each of the above constituent is described below with reference to FIG. 3(b).

Ceramic particles 116 which constitute the cell wall in FIG. 3(b) are silicon carbide particles, and a porous body is formed by sintering of these silicon carbide particles.

As described in the examples below, the cell wall in FIG. 3(b) is produced by mixing a coarse powder of silicon carbide (average particle size: 22 μm) and a fine powder of silicon carbide (average particle size: 0.5 μm) with other materials, and then performing a calcination.

In FIG. 3(b), a state is observed in which particles having a small particle size are deposited on top of the ceramic particles. These particles having a small particle size are the particles which constitute the filter layer and the inter-particle filtration bodies.

The detailed structure of the filter layer and the inter-particle filtration bodies is described below.

In FIG. 3(b), the position of the "surface of the cell wall" is indicated.

The method used for determining the position of the surface of the cell wall is described below.

First, in the electron microscope photograph, the two points which are located at outermost positions among the ceramic particles that constitute the cell wall are determined (point P and point Q). Next, a line $L_M$ is drawn connecting these two points. The position indicated by this line $L_M$ is deemed to be the "surface of the cell wall".

The layer formed from the particles of small particle size deposited on top of the cell wall surface $L_M$ is the filter layer 115.

The region formed from the particles of small particle size which have penetrated into the pores between ceramic particles positioned below the cell wall surface $L_M$ is an inter-particle filtration body 118.

In FIG. 3(b), the position of the inter-particle filtration body 118 is indicated by the region surrounded by the line $L_M$ and the dashed line.

As is evident from FIG. 3(a), discontinuity does not actually exist between the filter layer 115 and the inter-particle filtration body 118. In other words, the inter-particle filtration body 118 could also be said to be part of the filter layer. Moreover, the inter-particle filtration body 118 could also be said to be formed by penetration of a portion of the filter layer 115 into a pore 117 between ceramic particles.

The depth to which the inter-particle filtration body 118 penetrates into the pore 117 between the ceramic particles is represented by the depth from the cell wall surface $L_M$.

The depth to which the inter-particle filtration bodies penetrate can be measured by the method described below.

A honeycomb calcined body which constitutes the honeycomb filter is processed to prepare a sample with dimensions of 10 mm×10 mm×10 mm.

Figure 4:
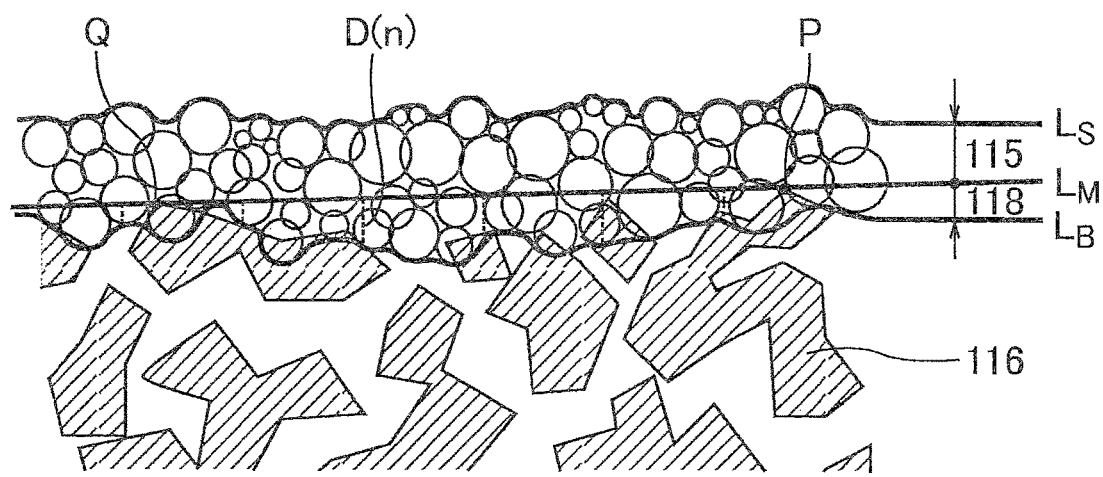
FIG. 4 is a cross-sectional view schematically illustrating a measurement method used when measuring the depth to which the inter-particle filtration bodies have penetrated.

For an arbitrary single position on the prepared sample, a cross section of the cell is then observed using a scanning electron microscope (SEM). The SEM imaging conditions include an accelerating voltage of 15.00 kV, a working distance (WD) of 15:00 mm, and a magnification of 500 to 1000×. In FIG. 4, in order to facilitate comprehension, a schematic illustration is shown instead of an actual SEM photograph.

Next, as illustrated in FIG. 4, a line is drawn along the bottom surfaces of the particles that constitute the filter layer (the inter-particle filtration bodies), and this is deemed the bottom surface $L_B$. Further, a line is also drawn along the top surfaces of the particles that constitute the filter layer, and this is deemed the top surface Ls.

Further, the line $L_M$ drawn in FIG. 3(b) is also drawn.

Subsequently, the SEM photograph is divided into 50 portions in the left-right direction (the longitudinal direction of the honeycomb calcined body). The distance between the line $L_M$ and the bottom surface $L_B$ is measured in a position in each of the 50 portions, and this value is deemed the penetration depth D(n) of the inter-particle filtration bodies at the nth position (wherein n is an integer of 1 to 50). The average value of D(1) to D(50) is recorded as the penetration depth of the inter-particle filtration bodies.

It is desirable that the depth D to which the inter-particle filtration bodies penetrate from the surface of the cell wall is from 5 to 50 m from the surface of the cell wall.

Figure 5:
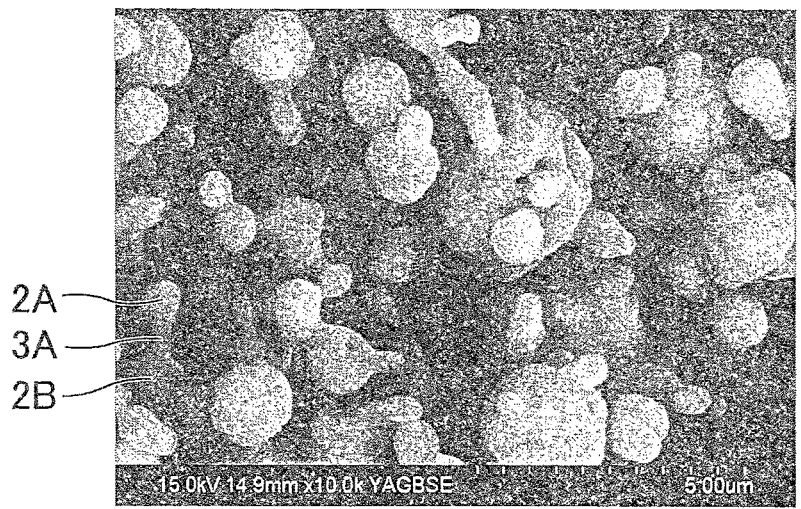
FIG. 5 is an electron microscope photograph of a filter layer.

FIG. 5 is an electron microscope photograph of a filter layer.

The filter layer illustrated in FIG. 5 is formed from a plurality of spherical ceramic particles and crosslinking bodies which bind the spherical ceramic particles to each other by crosslinking the spherical ceramic particles, and the spherical ceramic particles and the crosslinking bodies form a three-dimensional network structure.

In FIG. 5, the spherical ceramic particles and the crosslinking bodies are indicated by a spherical ceramic particle 2A, a spherical ceramic particle 2B, and a crosslinking body 3A.

It is evident from the photograph that the shapes of both the spherical ceramic particle 2A and the spherical ceramic particle 2B are spherical. It is also evident from the photograph that the particle sizes of the spherical ceramic particle 2A and the spherical ceramic particle 2B are larger than the particle size of the crosslinking body 3A.

Based on FIG. 5, it is clear that the crosslinking body 3A binds the spherical ceramic particle 2A and the spherical ceramic particle 2B together by crosslinking between the spherical ceramic particle 2A and the spherical ceramic particle 2B.

In the filter layer, a network structure exists in which the portions formed from the spherical ceramic particles and the crosslinking bodies can be seen as lines, and each space surrounded by the lines formed from the spherical ceramic particles and the crosslinking bodies can be seen as a single opening.

A plurality of crosslinking bodies can bind to a single spherical ceramic particle, and a plurality of spherical ceramic particles can bind to a single crosslinking body, and by binding the spherical ceramic particles and crosslinking bodies in continuous succession, a network shape is formed for the entire filter layer.

The bonds between the spherical ceramic particles and the crosslinking bodies have a variety of orientations, and the network shape is not formed as a flat shape on a specific plane, but rather is formed three-dimensionally across the thickness direction of the filter layer, and therefore the network structure adopts a three-dimensional shape.

The inter-particle filtration bodies are bodies formed when portions of the filter layer penetrate into the pores formed by the ceramic particles. Accordingly, the inter-particle filtration bodies have the same structure as the filter layer shown in FIG. 5.

In other words, the inter-particle filtration bodies are formed from a plurality of spherical ceramic particles and crosslinking bodies which bind the spherical ceramic particles to each other by crosslinking the spherical ceramic particles, and the spherical ceramic particles and the crosslinking bodies form a three-dimensional network structure.

The crosslinking bodies can also be said to be rod-shaped bodies which exist between the spherical ceramic particles and have a shape that is narrower in the central portion than at both end portions that bind to the spherical ceramic particles.

The description that the crosslinking bodies are narrower in the central portion means that the cross-sectional area at both end portions of each crosslinking body is relatively larger than the cross-sectional area in the central portion of the crosslinking body. In other words, the spherical ceramic particles and the crosslinking bodies are bound strongly by surface contact rather than point contact. When the spherical ceramic particles and the crosslinking bodies are bound strongly by surface contact, a more robust filter layer can be obtained in which particles are even less likely to become detached.

Further, the description that the crosslinking bodies are rod-shaped bodies having a shape that is narrower in the central portion means that the crosslinking bodies have formed a neck as a result of sintering. Because the bonds produced by sintering have a powerful binding force, a robust filter layer can be obtained.

Furthermore, because the spherical ceramic particles are bound to other spherical ceramic particles via a plurality of crosslinking bodies, it is thought that thermal stress applied to the spherical ceramic particles is dispersed across the plurality of crosslinking bodies, so that detachment of the filter layer becomes unlikely.

Figure 6:
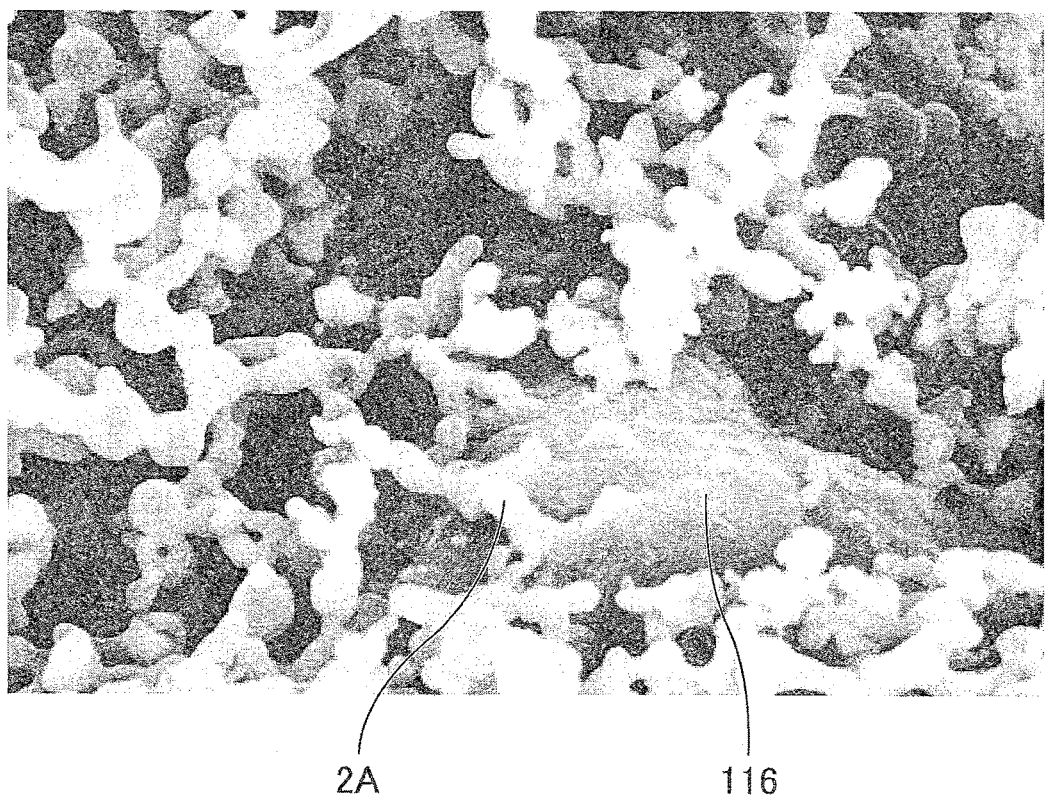
FIG. 6 is an electron microscope photograph showing the binding between the inter-particle filtration bodies and the ceramic particles which constitute the cell walls.

FIG. 6 is an electron microscope photograph showing the binding between the inter-particle filtration bodies and the ceramic particles which constitute the cell walls.

FIG. 6 shows a state in which spherical ceramic particles 2A which constitute inter-particle filtration bodies are bound to a SiC particle 116 which is a ceramic particle that constitutes the cell wall.

The average particle size of the spherical ceramic particles in the inter-particle filtration bodies is preferably from 0.2 to 1.2 µm.

The average particle size of the particles that constitute the filter layer can be measured by the following method.

A honeycomb calcined body which constitutes the honeycomb filter is processed to prepare a sample with dimensions of 10 mm×10 mm×10 mm.

A single arbitrary position on the surface of the prepared sample is then observed using a scanning electron microscope (SEM). At this time, the conditions are set so that the particles that constitute the filter layer appear within a single field of view. Here, as SEM, model FE-SEM S-4800 manufactured by Hitachi, Ltd. can be used. Further, the imaging conditions for the SEM include an accelerating voltage of 15.00 kV, a working distance (WD) of 15:00 mm, and a magnification of 10,000×.

Next, the particle size of every particle within the single field of view is measured visually. The average value of the particle sizes of all the particles measured in the single field of view is deemed the average particle size.

In the honeycomb filter according to the first embodiment of the present invention, the spherical ceramic particles preferably include heat-resistant oxide ceramic particles.

Examples of the heat-resistant oxide ceramic particles include alumina, silica, mullite, ceria, zirconia, cordierite, zeolite, and titania. These may be used individually, or a combination of two or more of them may be used.

Of the above heat-resistant oxide ceramic particles, alumina is preferred.

In the honeycomb filter according to the first embodiment of the present invention, the filter layer is formed only on the surface of the cell walls of those cells in which the end section at the fluid inlet side is open and the end section at the fluid outlet side is sealed.

Because the exhaust gas is introduced into the cells from the fluid inlet side of the honeycomb filter, the PM in the exhaust gas is deposited in large amounts on the cell walls of those cells in which the end section at the fluid inlet side is open and the end section at the fluid outlet side is sealed. Accordingly, if the filter layer is formed only on the surface of the cell walls of those cells in which the end section at the fluid inlet side is open and the end section at the fluid outlet side is sealed, then the PM can be trapped by the filter layer, and depth filtration can be prevented.

In the honeycomb filter according to the first embodiment of the present invention, examples of the shapes of cross sections perpendicular to the longitudinal direction of the large volume cells and the small volume cells within the honeycomb calcined bodies include the shapes described below.

Figure 7:
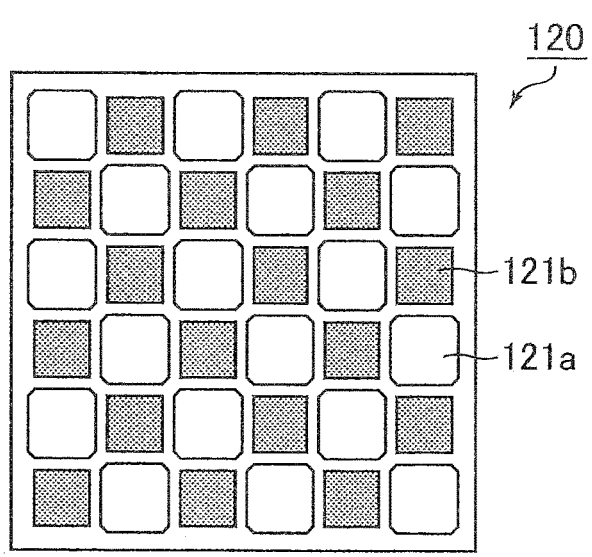
FIG. 7(a), FIG. 7(b) and FIG. 7(c) are side views schematically illustrating examples of the cell structure of the honeycomb calcined body that constitutes the honeycomb filter according to the first embodiment of the present invention.
Figure 7:
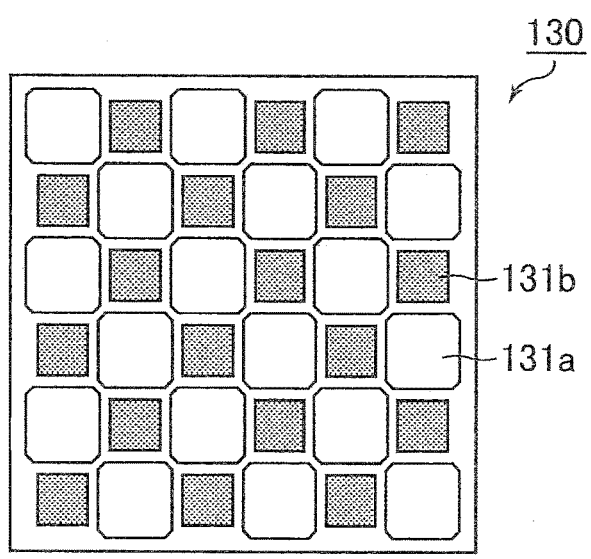
Figure 7:
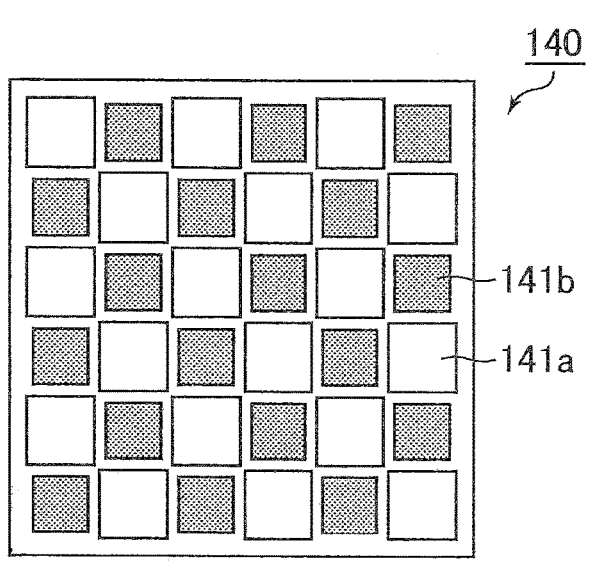

FIG. 7(a), FIG. 7(b) and FIG. 7(c) are side views schematically illustrating examples of the cell structure of a honeycomb calcined body that constitutes the honeycomb filter according to the first embodiment of the present invention.

In FIG. 7(a), FIG. 7(b) and FIG. 7(c), the filter layer is not shown.

In a honeycomb calcined body 120 illustrated in FIG. 7(a), the shape of large volume cells 121a in a cross section perpendicular to the longitudinal direction is substantially octagonal, the shape of small volume cells 121b in a cross section perpendicular to the longitudinal direction is substantially tetragonal, and the large volume cells 121a and the small volume cells 121b are arranged in an alternating pattern. Similarly, in a honeycomb calcined body 130 illustrated in FIG. 7(b), the shape of large volume cells 131a in a cross section perpendicular to the longitudinal direction is substantially octagonal, the shape of small volume cells 131b in a cross section perpendicular to the longitudinal direction is substantially tetragonal, and the large volume cells 131a and the small volume cells 131b are arranged in an alternating pattern. The honeycomb calcined body 120 illustrated in FIG. 7(a) and the honeycomb calcined body 130 illustrated in FIG. 7(b) have different area ratios between the area of a cross section perpendicular to the longitudinal direction of a large volume cell relative to the area of a cross section perpendicular to the longitudinal direction of a small volume cell (area of cross section perpendicular to the longitudinal direction of large volume cell/area of cross section perpendicular to the longitudinal direction of small volume cell).

Furthermore, in a honeycomb calcined body 140 illustrated in FIG. 7(c), the shape of large volume cells 141a in a cross section perpendicular to the longitudinal direction is substantially tetragonal, the shape of small volume cells 141b in a cross section perpendicular to the longitudinal direction is substantially tetragonal, and the large volume cells 141a and the small volume cells 141b are arranged in an alternating pattern.

In the honeycomb filter according to the first embodiment of the present invention, the area ratio of the area of a cross section perpendicular to the longitudinal direction of a large volume cell relative to the area of a cross section perpendicular to the longitudinal direction of a small volume cell (area of cross section perpendicular to the longitudinal direction of large volume cell/area of cross section perpendicular to the longitudinal direction of small volume cell) is preferably within a range from 1.4 to 2.8, and more preferably from 1.5 to 2.4.

By using the large volume cells as the fluid inlet side cells and the small volume cells as the fluid outlet side cells, a large amount of PM can be deposited on the fluid inlet side cells (large volume cells), but if the aforementioned area ratio is less than 1.4, then because the difference between the cross sectional area of the large volume cells and the cross sectional area of the small volume cells is small, the effects obtained by providing large volume cells and small volume cells are difficult to achieve. On the other hand, if the area ratio exceeds 2.8, then the area of the cross section perpendicular to the longitudinal direction of the small volume cells becomes too small, and the friction generated when a gas such as an exhaust gas passes through the fluid outlet side cells (small volume cells) causes an increase in the pressure loss.

Next, a production method for a honeycomb filter according to the first embodiment of the present invention is described.

A production method for a honeycomb filter according to a first embodiment of the present invention is a production method for a honeycomb filter comprising:

a ceramic honeycomb substrate in which a multitude of cells through which a fluid flows are disposed in parallel in a longitudinal direction and are separated by cell walls, each cell being sealed at an end section at either the fluid inlet side or the fluid outlet side, and a filter layer which, among the surfaces of the cell walls, is formed on the surface of the cell walls of those cells in which the end section at the fluid inlet side is open and the end section at the fluid outlet side is sealed, in which the ceramic honeycomb substrate is formed from a porous body of sintered ceramic particles, a portion of the filter layer penetrates from the surface of the cell walls into pores formed by the ceramic particles, thereby forming inter-particle filtration bodies, these inter-particle filtration bodies are formed from a plurality of spherical ceramic particles and crosslinking bodies which bind the spherical ceramic particles to each other by crosslinking the spherical ceramic particles, and the spherical ceramic particles and the crosslinking bodies form a three-dimensional network structure, the production method comprising:

a honeycomb calcined body production step of producing, from ceramic powders, a porous honeycomb calcined body in which a multitude of cells are disposed in parallel in a longitudinal direction and are separated by cell walls, each cell being sealed at an end section at either the fluid inlet side or the fluid outlet side, a droplet dispersion step of dispersing droplets containing a raw material of the spherical ceramic particles in a carrier gas, a drying step of drying the carrier gas at 100 to 800° C., thereby forming spherical ceramic particles from the droplets containing the raw material of the spherical ceramic particles, an inflow step of introducing the carrier gas into those cells in which the end section at the fluid inlet side is open and the end section at the fluid outlet side is sealed, thereby depositing the spherical ceramic particles on the surface of the cell walls and causing the spherical ceramic particles to penetrate into the pores, and a heating step of heating the ceramic honeycomb substrate to 1100 to 1500° C.

In the production method for the honeycomb filter according to the first embodiment of the present invention, a ceramic honeycomb substrate containing honeycomb calcined bodies is prepared, and a filter layer is formed on the surface of the cell walls of the ceramic honeycomb substrate.

Prior to describing the other steps, the procedure for the steps for forming the filter layer is described below.

In the present embodiment, the filter layer is formed on the surface of the cell walls of the ceramic honeycomb substrate by performing the droplet dispersion step, the drying step, the carrier gas inflow step, and the ceramic honeycomb substrate heating step.

Furthermore, in the description of the present embodiment, the case in which the material that constitutes the filter layer is a heat-resistant oxide is described as an example.

The step of preparing the ceramic honeycomb substrate containing the honeycomb calcined bodies will be described later in the specification.

Figure 8:
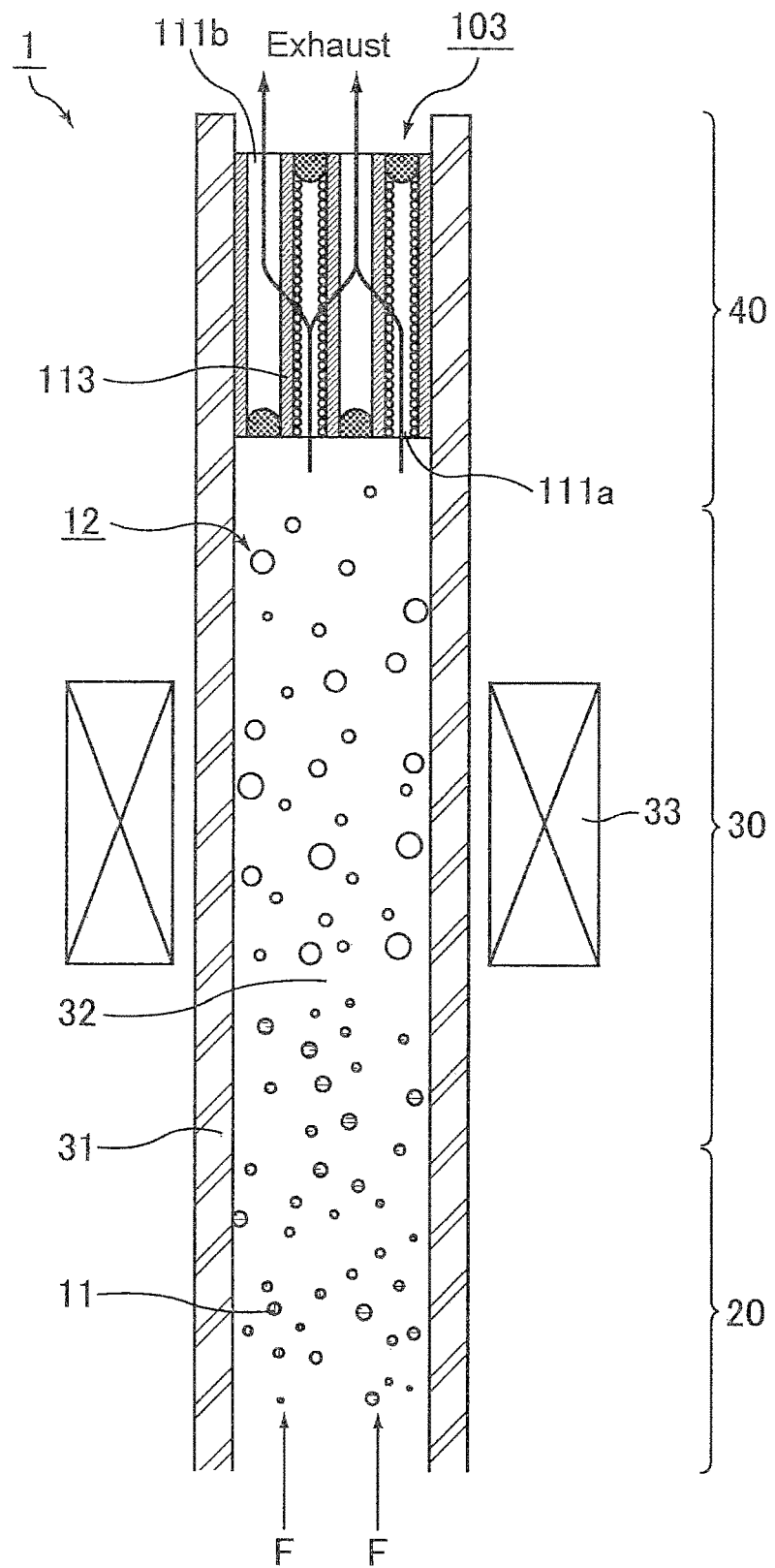
FIG. 8 is a cross-sectional view schematically illustrating an embodiment of a droplet dispersion step and a carrier gas inflow step.

FIG. 8 is a cross-sectional view schematically illustrating an embodiment of the droplet dispersion step and the carrier gas inflow step.

FIG. 8 shows a carrier gas inflow device 1, which is a device that introduces the carrier gas into the cells of the ceramic honeycomb substrate.

The carrier gas inflow device 1 comprises a droplet dispersion section 20 which disperses droplets within the carrier gas, a pipe section 30 through which the carrier gas containing the dispersed droplets travels, and an inflow section 40 which introduces the carrier gas into the cells of the ceramic honeycomb substrate.

An example of using the carrier gas inflow device 1 to perform the droplet dispersion step and the carrier gas inflow step is described below.

In the carrier gas inflow device 1, a carrier gas F flows from the bottom of FIG. 8 toward the top. In the carrier gas inflow device 1, the carrier gas F is introduced from the bottom of the carrier gas inflow device 1, passes through the droplet dispersion section 20, the pipe section 30 and the inflow section 40, and is discharged from the top of the inflow section 40.

The carrier gas F is pressurized from the bottom to the top in FIG. 8, by a pressure difference produced by either a pressure applied from below the carrier gas inflow device or a suction applied from above the carrier gas inflow device, causing the carrier gas F to flow upward through the inside of the carrier gas inflow device 1.

A gas which does not react upon heating up to 800° C. and does not react with the components in the droplets dispersed within the carrier gas is used as the carrier gas.

Examples of the carrier gas include gases such as air, nitrogen, and argon.

In the droplet dispersion section 20 of the carrier gas inflow device 1, an oxide-containing solution stored in a tank not shown in the figure is converted to droplets 11 by spraying, and dispersed within the carrier gas F.

The expression "oxide-containing solution" is a concept which includes a solution containing a heat-resistant oxide precursor which forms a heat-resistant oxide upon heating, or a slurry containing heat-resistant oxide particles.

A heat-resistant oxide precursor means a compound which is converted to a heat-resistant oxide by heating.

Examples include a hydroxide, carbonate, nitrate or hydrate of the metal that constitutes the heat-resistant oxide.

Examples of the heat-resistant oxide precursor when the heat-resistant oxide is alumina, that is an alumina precursor, include aluminum nitrate, aluminum hydroxide, boehmite, and diaspore.

Furthermore, the slurry containing heat-resistant oxide particles is a solution of heat-resistant oxide particles suspended in water.

The droplets 11 dispersed in the carrier gas F flow upward through the carrier gas inflow device 1, carried by the flow of the carrier gas F, and pass through the pipe section 30.

The pipe section 30 of the carrier gas inflow device 1 is a pipe through which the carrier gas F containing the dispersed droplets 11 passes.

A channel 32 of the pipe section 30 through which the carrier gas F passes is a space enclosed by a pipe wall 31 of the pipe.

In the carrier gas inflow device 1 used in the present embodiment, a heating mechanism 33 is provided on the pipe section 30. An example of the heating mechanism 33 is an electric heater or the like.

In the present embodiment, the pipe wall 31 of the pipe is heated using the heating mechanism 33, and the carrier gas F containing the dispersed droplets 11 is passed through the pipe section 30. Accordingly, the carrier gas F that passes through the pipe section 30 is heated, thereby heating the droplets 11 dispersed within the carrier gas F. When the droplets 11 are heated, the liquid component contained in the droplets evaporates, forming spherical ceramic particles 12.

In FIG. 8, the spherical ceramic particles 12 are depicted as white circles.

The spherical ceramic particles are particles of a heat-resistant oxide, and are particles having a spherical shape.

When the droplets contain a heat-resistant oxide precursor, heating the carrier gas causes the heat-resistant oxide precursor to become a heat-resistant oxide (spherical ceramic particles).

In the present embodiment, it is preferable that the pipe wall 31 of the pipe is heated to 100 to 800° C. using the heating mechanism 33, and that the carrier gas F containing the dispersed droplets 11 passes through the pipe in 0.1 to 3.0 seconds.

If the temperature of the heated pipe is less than 100° C., and the time taken for the carrier gas to pass through the pipe is less than 0.1 second, then the water in the droplets may not be able to be evaporated adequately.

On the other hand, if the temperature of the heated pipe exceeds 800° C., and the time taken for the carrier gas to pass through the pipe exceeds 3.0 seconds, then the amount of energy required to produce the honeycomb filter becomes too large, reducing the production efficiency of the honeycomb filter.

In the present embodiment, there are no particular restrictions on the length of the pipe, but the length is preferably from 500 to 3,000 mm.

If the length of the pipe is less than 500 mm, then the water in the droplets cannot be adequately evaporated even if the carrier gas is passed through the pipe slowly. On the other hand, if the length of the pipe exceeds 3,000 mm, then the device used to produce the honeycomb filter becomes too large, reducing the production efficiency of the honeycomb filter.

The spherical ceramic particles 12 remain dispersed within the carrier gas F, flow upward through the carrier gas inflow device 1 carried by the flow of the carrier gas F, and flow into the cells of the ceramic honeycomb substrate 103 in the inflow section 40.

In the present embodiment, a ceramic block formed by bundling a plurality of honeycomb calcined bodies together via adhesive material layers is used as the ceramic honeycomb substrate.

The ceramic honeycomb substrate 103 is disposed at the top of the carrier gas inflow device 1 so as to cover the outlet of the carrier gas inflow device 1.

As a result, the carrier gas F must necessarily flow into the interior of the ceramic honeycomb substrate 103.

In FIG. 8, a cross section of the honeycomb calcined body that constitutes the ceramic block (a similar cross section to that illustrated in FIG. 2(*b*)) is shown schematically as the cross section of the ceramic honeycomb substrate 103.

In the ceramic honeycomb substrate 103, the end sections of the fluid inlet side cells 111*a* are open, and the fluid outlet side cells 111*b* are sealed.

As a result, the carrier gas F flows into the ceramic honeycomb substrate 103 through the openings of the fluid inlet side cells 111*a*.

When the carrier gas F containing the dispersed spherical ceramic particles 12 flows into the fluid inlet side cells 111*a* of the ceramic honeycomb substrate 103, the spherical ceramic particles 12 are deposited on the surfaces of the cell walls 113 of the ceramic honeycomb substrate 103.

Further, in the present embodiment, the ceramic honeycomb substrate 103 is preferably heated to 100 to 800° C., so that the carrier gas F is introduced into heated cells.

When the ceramic honeycomb substrate 103 is heated to 100 to 800° C., even if any liquid components remain in the spherical ceramic particles 12, these liquid components evaporate, so that the spherical ceramic particles are deposited on the surface of the cell walls in a dried powder state.

Further, the powder of spherical ceramic particles also penetrates into the pores formed by the ceramic particles which constitute the cell walls of the ceramic honeycomb substrate.

The carrier gas F is introduced into the interior of the ceramic honeycomb substrate 103 through the openings of the fluid inlet side cells 111*a*, passes through the cell walls 113 of the ceramic honeycomb substrate 103, and flows out through the openings of the fluid outlet side cells 111*b*.

The carrier gas inflow step is performed using this type of procedure.

Subsequently, the ceramic honeycomb substrate heating step is performed.

The ceramic honeycomb substrate having the spherical ceramic particles adhered to the cell walls as a result of the carrier gas inflow step is heated at a furnace temperature of 1100 to 1500° C. using a heating furnace.

An open air atmosphere, nitrogen atmosphere or argon atmosphere is preferable as the heating atmosphere.

As described previously, this heating step causes a portion of the spherical ceramic particles to undergo sintering, thus forming crosslinking bodies which bind the spherical ceramic particles to each other. In other words, as a result of the heating step, a filter layer having a three-dimensional network structure is formed.

Further, inter-particle filtration bodies having a three dimensional network structure are formed in the pores formed by the ceramic particles which constitute the cell walls of the ceramic honeycomb substrate.

Moreover, as a result of the heating, the spherical ceramic particles adhered to the surfaces of the cell walls undergo thermal contraction, which anchors the particles strongly to the surfaces of the cell walls. Accordingly, the filter layer and the inter-particle filtration bodies comprising the spherical ceramic particles are formed in a robust manner on the surfaces of the cell walls and in the pores formed by the ceramic particles which constitute the cell walls.

In the production method for the honeycomb filter according to the first embodiment of the present invention, the steps for preparing the ceramic honeycomb substrate containing the honeycomb calcined bodies are described below.

The ceramic honeycomb substrate prepared by the following steps is a ceramic block formed by bundling a plurality of honeycomb calcined bodies together via adhesive material layers.

In the following explanation, silicon carbide is used as an example of the ceramic powder.

(1) A molding step is performed in which a honeycomb molded body is prepared by extrusion molding of a wet mixture containing the ceramic powder and a binder.

Specifically, first, a wet mixture for producing the honeycomb molded body is prepared by mixing silicon carbide powders with different average particle sizes as the ceramic powder, an organic binder, a liquid plasticizer, a lubricant, and water.

Next, the wet mixture is fed into an extrusion molding machine and extrusion molded to prepare a honeycomb molded body with a predetermined shape.

Here, the honeycomb molded body is prepared using a mold that produces a cross-sectional shape having the cell structure (cell shape and cell arrangement) illustrated in FIG. 2(*a*) and FIG. 2(*b*).

(2) The honeycomb molded body is cut to a predetermined length and dried using a microwave dryer, hot air dryer, dielectric dryer, reduced pressure dryer, vacuum dryer, or freeze dryer or the like, and a sealing step is then performed in which predetermined cells are packed with a sealing material paste that becomes the sealing material, thereby sealing those cells.

Here, the wet mixture described above can be used as the sealing material paste.

(3) After performing a degreasing step in which the honeycomb molded body is heated in a degreasing furnace to remove the organic matter within the honeycomb molded body, the degreased honeycomb molded body is transported into a calcining furnace and subjected to a calcination step, thereby preparing a honeycomb calcined body of the type illustrated in FIG. 2(*a*) and FIG. 2(*b*).

The sealing material paste packed at the end sections of the cells is calcined by the heating and forms the sealing material.

Furthermore, the conditions for the cutting step, the drying step, the sealing step, the degreasing step and the calcination step can employ the types of conditions conventionally used to prepare honeycomb calcined bodies.

(4) A bundling step is performed in which a plurality of honeycomb calcined bodies are sequentially laminated together via an adhesive material paste upon a support stage, thereby preparing a honeycomb aggregated body having a plurality of stacked honeycomb calcined bodies.

For the adhesive material paste, for example, a paste prepared from an inorganic binder, an organic binder and inorganic particles is used. Further, the adhesive material paste may also contain inorganic fibers and/or whiskers.

(5) By heating the honeycomb aggregated body, the adhesive material paste is thermally hardened and forms an adhesive material layer, thus preparing a quadrangular prism-shaped ceramic block.

The thermal hardening conditions for the adhesive material paste may be the types of conditions conventionally used when preparing honeycomb filters.

(6) A cutting step is performed in which the ceramic block is cut.

Specifically, by cutting the outer periphery of the ceramic block using a diamond cutter, a ceramic block is prepared with an outer periphery that has been processed to a substantially circular cylindrical shape.

(7) An outer periphery coating layer formation step is performed in which an outer periphery coating material paste is applied to the outer peripheral surface of the substantially circular cylindrical ceramic block, and then dried and solidified to form an outer periphery coating layer.

Here, the adhesive material paste mentioned above can be used as the outer periphery coating material paste. A paste with a different composition from the above adhesive material paste may also be used as the outer periphery coating material paste.

The outer periphery coating layer need not necessarily be provided, and may be provided as required.

By providing the outer periphery coating layer, the shape of the outer periphery of the ceramic block can be neatened, enabling a ceramic honeycomb substrate with a circular cylindrical shape to be obtained.

By performing the above steps, a ceramic honeycomb substrate containing honeycomb calcined bodies can be prepared.

By subsequently subjecting the ceramic honeycomb substrate to the aforementioned droplet dispersion step, carrier gas inflow step, and ceramic honeycomb substrate heating step, the filter layer can be formed on the surface of the cell walls of the ceramic honeycomb substrate, thus preparing a honeycomb filter.

Examples of the functions and effects of the honeycomb filter according to the first embodiment of the present invention are described below.

(1) In the honeycomb filter of the present embodiment, the ceramic honeycomb substrate is formed from a porous body of sintered ceramic particles, and pores are formed by the ceramic particles.

Further, the inter-particle filtration bodies, which represent a portion of the filter layer, penetrate into these pores formed by the ceramic particles.

Because the filter layer is formed so as to conform to the unevenness within the cell walls produced by the pores, an anchoring effect is obtained, so that detachment of the entire filter layer from the cell walls is prevented.

Furthermore, because the ceramic particles and the spherical ceramic particles which constitute the inter-particle filtration bodies are bound together, detachment of the filter layer from the cell walls is prevented.

Moreover, because the spherical ceramic particles which constitute the inter-particle filtration bodies are bound to other spherical ceramic particles by a plurality of crosslinking bodies, it is thought that thermal stress applied to the spherical ceramic particles is dispersed across the plurality of crosslinking bodies, making detachment of the filter layer unlikely.

(2) In the honeycomb filter of the present embodiment, the inter-particle filtration bodies have a three dimensional network structure in which spherical ceramic particles are bound together by crosslinking bodies. When the spherical ceramic particles are bound together by crosslinking bodies, a robust structure is obtained in which the particles are bound strongly together.

(3) In the honeycomb filter of the present embodiment, the inter-particle filtration bodies have a robust structure in which the particles are bound together by crosslinking structures, and the inter-particle filtration bodies penetrate inside the cell walls via an anchoring effect, and therefore partial detachment of the particles that constitute the filter layer from the filter layer in the form of particle units is prevented. Further, detachment of the entire filter layer from the cell walls in a single action is also prevented. Accordingly, the filter layer of the honeycomb filter described above can perform the role of trapping and accumulating PM over a long period of time.

(4) In the honeycomb filter of the present embodiment, it is desirable that the average pore size of the pores within the inter-particle filtration bodies is larger than the average particle size of the spherical ceramic particles.

The fact that the average pore size of the pores formed as a result of the formation of a three dimensional network structure is larger than the average particle size of the spherical ceramic particles indicates that the pores provided in the inter-particle filtration bodies are sufficiently large to enable the gas components within the exhaust gas to pass through the inter-particle filtration bodies.

In other words, a honeycomb filter is obtained in which any increase in the pressure loss caused by providing the inter-particle filtration bodies is small.

(5) In the honeycomb filter according to the present embodiment, it is desirable that the inter-particle filtration bodies penetrate 5 to 50 µm from the surface of the cell walls.

If the depth to which the inter-particle filtration bodies penetrate is less than 5 µm, then the anchoring effect whereby the inter-particle filtration bodies penetrate into the pores formed by the ceramic particles tends not to be sufficient. Further, if the depth to which the inter-particle filtration bodies penetrate exceeds 50 µm, then the filter layer penetrates too far into the cell walls, and there may be an undesirable increase in the pressure loss.

(6) In the honeycomb filter of the present embodiment, it is desirable that the average particle size of the spherical ceramic particles is from 0.2 to 1.2 µm.

If the average particle size of the spherical ceramic particles is less than 0.2 µm, then there is a possibility that the spherical ceramic particles may penetrate into the interior (fine pores) of the cell walls and block the fine pores, causing the pressure loss to increase. On the other hand, if the average particle size of the spherical ceramic particles exceeds 1.2 µm, then because the spherical ceramic particles are too large, even if inter-particle filtration bodies are formed, the pore size of the inter-particle filtration bodies is large. Consequently, PM passes through the inter-particle filtration bodies and penetrates into the fine pores of the cell walls, causing a "depth filtration" state in which PM is trapped inside the cell walls, which increases pressure loss.

(7) In the honeycomb filter of the present embodiment, it is desirable that the average pore size of the pores within the inter-particle filtration bodies is from 0.2 to 1.2 µm.

If the average pore size of the pores within the inter-particle filtration bodies is less than 0.2 µm, then the pores provided within the inter-particle filtration bodies are small, and because it becomes difficult for the gas components within the exhaust gas to pass through the inter-particle filtration bodies, the pressure loss may sometimes increase.

If the average pore size of the pores within the inter-particle filtration bodies exceeds 1.2 µm, then because the pores are too large, there is a possibility that PM may pass through the inter-particle filtration bodies, causing "depth filtration" in which the PM penetrates into the fine pores of the cell walls.

(8) In the honeycomb filter of the present embodiment, the porosity of the ceramic honeycomb substrate is from 55 to 70%.

In a honeycomb filter having a comparatively high porosity of 55 to 70%, the gaps between the ceramic particles that constitute the cell walls are wide, and the particles that constitute the filter layer can readily penetrate between the ceramic particles that constitute the cell walls, and therefore this type of honeycomb filter is suited to penetration of the filter layer from the surface of the cell walls into the pores formed by the ceramic particles, thereby forming inter-particle filtration bodies.

Further, because the gaps between the ceramic particles that constitute the cell walls are wide and the pressure loss due to the cell walls themselves is low, even if the depth to which the inter-particle filtration bodies penetrate is great, the pressure loss does not become too high. As a result, a honeycomb filter can be obtained which has low pressure loss while exhibiting a favorable anchoring effect.

(9) In the honeycomb filter of the present embodiment, the spherical ceramic particles are heat-resistant oxide ceramic particles, and the heat-resistant oxide ceramic particles are at least one type selected from the group consisting of alumina, silica, mullite, ceria, zirconia, cordierite, zeolite and titania.

When the inter-particle filtration bodies are formed from a heat-resistant oxide, even if a regeneration process is performed to incinerate the PM, problems such as melting of the filter layer are unlikely to occur. As a result, a honeycomb filter having excellent heat resistance can be obtained.

(10) In the honeycomb filter of the present embodiment, the ceramic honeycomb substrate comprises silicon carbide or a silicon-containing silicon carbide.

Silicon carbide and silicon-containing silicon carbides have a high degree of hardness and an extremely high thermal decomposition temperature. As a result, the honeycomb filter becomes a honeycomb filter that exhibits excellent mechanical properties and heat resistance.

(11) In the honeycomb filter according to the present embodiment, the cells that constitute the ceramic honeycomb substrate comprise large volume cells and small volume cells, wherein the cross-sectional area of a cross section perpendicular to the longitudinal direction of the large volume cells is larger than the cross-sectional area of a cross section perpendicular to the longitudinal direction of the small volume cells. As a result, compared with a honeycomb filter in which the cross-sectional areas of all the cells are the same, the filtration area is larger, and a larger amount of PM can be accumulated before a regeneration process is performed.

(12) In the honeycomb filter according to the present embodiment, it is desirable that the shape of the cross section perpendicular to the longitudinal direction of the large volume cells is substantially octagonal, and the shape of the cross section perpendicular to the longitudinal direction of the small volume cells is substantially tetragonal. Consequently, the large volume cells and the small volume cells can easily be arranged with good symmetry, so that a honeycomb filter having excellent mechanical strength is obtained where distortion or the like is unlikely to occur.

(13) In the honeycomb filter according to the present embodiment, it is desirable that the shape of the cross section perpendicular to the longitudinal direction of the large volume cells is substantially tetragonal, and the shape of the cross section perpendicular to the longitudinal direction of the small volume cells is substantially tetragonal.

As a result, the large volume cells and the small volume cells which constitute the honeycomb calcined body can easily be arranged with good symmetry, so that a honeycomb filter having excellent mechanical strength is obtained where distortion or the like is unlikely to occur.

EXAMPLES

The honeycomb filter of the first embodiment of the present invention and the production method for the honeycomb filter are described below in more detail using specific examples. However, the present invention is not limited solely to these examples.

Example 1

Preparation of Ceramic Honeycomb Substrate

First, a molding step was performed by mixing 54.6% by weight of a coarse powder of silicon carbide with an average particle size of 22 µm and 23.4% by weight of a fine powder of silicon carbide with an average particle size of 0.5 µm, to which 4.3% by weight of an organic binder (methyl cellulose), 2.6% by weight of a lubricant (Unilube manufactured by NOF Corporation), 1.2% by weight of glycerol and 13.9% by weight of water were added and kneaded to obtain a wet mixture, which was then extrusion-molded.

In this step, crude honeycomb molded bodies having the same shape as the honeycomb calcined body 110 illustrated in FIG. 2(a) but with no sealing of the cells were prepared.

Next, dried honeycomb molded bodies were prepared by drying the crude honeycomb molded bodies using a microwave dryer. Subsequently, a sealing material paste was packed into predetermined cells of the dried honeycomb molded bodies, thereby sealing the cells. A part of the wet mixture described above was used as the sealing material paste. After sealing the cells, the dried honeycomb molded bodies packed with the sealing material paste were dried again using a dryer.

Subsequently, the dried honeycomb molded bodies with sealed cells were subjected to a degreasing treatment at 400° C. to degrease the dried honeycomb molded bodies, and were then subjected to a calcination treatment in a normal pressure argon atmosphere at 2200° C. for 3 hours.

As a result, quadrangular prism-shaped honeycomb calcined bodies were prepared.

The porosity of the honeycomb calcined bodies measured by the mercury penetration method was 63%.

An adhesive material paste was applied on the honeycomb calcined bodies obtained by the above steps, thus forming adhesive material paste layers, and by thermally hardening the adhesive material paste layers to form adhesive material layers, a substantially prism-shaped ceramic block composed of 16 honeycomb calcined bodies bundled together via the adhesive material layers was prepared.

For the adhesive material paste, an adhesive material paste containing 30% by weight of alumina fibers with an average fiber length of 20 μm, 21% by weight of silicon carbide particles with an average particle size of 0.6 μm, 15% by weight of a silica sol, 5.6% by weight of carboxymethyl cellulose, and 28.4% by weight of water was used.

Subsequently, a circular cylindrical ceramic block with a diameter of 142 mm was prepared by using a diamond cutter to cut the outer periphery of the prism-shaped ceramic block.

Next, an outer periphery coating material paste was applied to the outer peripheral surface of the circular cylindrical ceramic block, and the outer periphery coating material paste was thermally hardened at 120° C. to form an outer periphery coating layer on the outer peripheral portion of the ceramic block.

The same paste as the adhesive material paste described above was used as the outer periphery coating material paste.

As a result of the above steps, a circular cylindrical ceramic honeycomb substrate with a diameter of 143.8 mm and a length of 150 mm was prepared.

(Droplet Dispersion Step and Filter Layer Formation Step)

A filter layer was formed on the ceramic honeycomb substrate using the carrier gas inflow device illustrated in FIG. 8.

The ceramic honeycomb substrate was placed at the top of the carrier gas inflow device as illustrated in FIG. 8.

At this time, the ceramic honeycomb substrate was positioned so that the openings of the large volume cells, as the fluid inlet side cells, faced toward the bottom of the carrier gas inflow device.

A solution containing boehmite, which is a heat-resistant oxide precursor, was prepared as an oxide-containing solution. The boehmite concentration was 3.8 mol/l.

Droplets containing boehmite were then dispersed in the carrier gas by spraying.

The pipe wall of the pipe of the carrier gas inflow device was heated to a temperature of 200° C., and the carrier gas was introduced so as to flow toward the top of the carrier gas inflow device (the ceramic honeycomb substrate side) at a flow rate of 15.8 mm/sec, thereby evaporating the moisture within the droplets dispersed in the carrier gas. As a result of the evaporation of the moisture in the droplets that occurred as the carrier gas passed through the pipe, the droplets were converted to spherical alumina particles.

The length of the pipe was 1200 mm.

The carrier gas containing the dispersed spherical alumina particles was introduced into the cells of the ceramic honeycomb substrate, and the spherical alumina particles were adhered to the surfaces of the cell walls.

Subsequently, the ceramic honeycomb substrate was removed from the carrier gas inflow device, and heated in a calcining furnace at 1350° C. for 3 hours in an open air atmosphere.

As a result of the above steps, a honeycomb filter was produced which had a filter layer composed of alumina particles formed on the surfaces of the cell walls.

Figure 3:
FIG. 3(a) is an electron microscope photograph of a cross section showing the cell wall, the filter layer and the inter-particle filtration bodies of a honeycomb filter.
FIG. 3(b) is a photograph clearly indicating the inter-particle filtration bodies and the like in FIG. 3(a).
Figure 3:
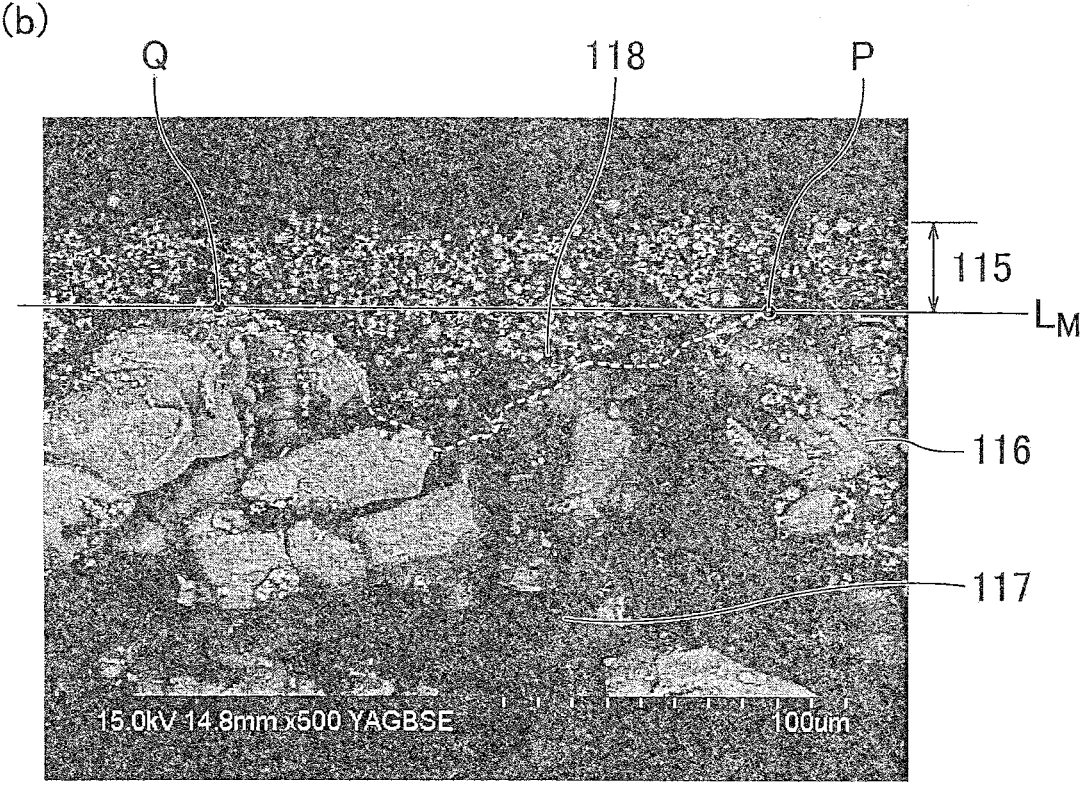

Electron microscope photographs of the honeycomb filter obtained by the above steps are shown in FIG. 3(*a*) and FIG. 3(*b*).

The conditions used for acquiring the SEM photographs are as follows: model FE-SEM S-4800 manufactured by Hitachi, Ltd., a backscattered electron image, an accelerating voltage of 15.0 kV, and a magnification of 500×. From these photographs, it was observed that a filter layer had been formed on the surface of the cell wall, and a portion of the filter layer had penetrated into the pores formed by the ceramic particles, thereby forming inter-particle filtration bodies.

Further, the inter-particle filtration bodies were seen to have penetrated 34 μm from the surface of the cell wall.

An electron microscope photograph of the filter layer obtained by the above steps is illustrated in FIG. 5.

Using the method described above relating to the honeycomb filter of the first embodiment, the average particle size of the spherical ceramic particles that appear in this photograph was calculated to be 0.5 μm.

The above honeycomb filter was evaluated in the manner described below.

(Observation of State of Detachment of Filter Layer)

The state of detachment of the filter layer was observed using the following procedure.

First, the honeycomb filter was dried in a dryer at 150° C. for 1 hour. Then, the honeycomb filter was immersed in water from the end section at the fluid outlet side, and subjected to ultrasonic cleaning (43 kHz) in the water for 30 minutes. Subsequently, water was introduced into the honeycomb filter from the end section at the fluid outlet side, and the water was passed through the cell walls and discharged from the end section at the fluid inlet side.

After draining the water, the honeycomb filter was placed in a dryer and dried at 150° C. for 2 hours.

Subsequently, the honeycomb filter was observed using an electron microscope to ascertain whether detachment of the filter layer had occurred.

Observation of the state of detachment of the filter layer for the honeycomb filter produced in Example 1 confirmed that no detachment had occurred, and that a robust filter layer had been formed.

(Other Embodiments)

In the honeycomb filter according to the first embodiment of the present invention, the filter layer is formed only on the surface of the cell walls of those cells in which the end section at the fluid inlet side is open and the end section at the fluid outlet side is sealed.

However, in a honeycomb filter according to another embodiment of the present invention, the filter layer may be formed not only on the surface of the cell walls of cells in which the end section at the fluid inlet side is open and the end section at the fluid outlet side is sealed, but also on the surface of the cell walls of cells in which the end section at the fluid inlet side is sealed and the end section at the fluid outlet side is open.

This type of honeycomb filter can be produced by immersing the ceramic honeycomb substrate in a slurry containing the spherical ceramic particles that has been prepared in advance, and then heating the resulting product.

In a production method for a honeycomb filter according to an embodiment of the present invention, the droplets may contain heat-resistant oxide particles as the raw material of the ceramic particles.

When the droplets contain heat-resistant oxide particles, particles of the heat-resistant oxide can be obtained by heating the carrier gas to remove the moisture within the droplets. Moreover, by introducing particles of the heat-resistant oxide into the cells, a filter layer composed of particles of the heat-resistant oxide can be formed.

Further, a filter layer composed of particles of the heat-resistant oxide can also be formed by introducing the droplets containing the heat-resistant oxide particles into the cells, and then removing the moisture within the droplets.

In a honeycomb filter according to an embodiment of the present invention, all of the cells of the honeycomb calcined bodies that constitute the honeycomb filter may have the same shape in a cross section perpendicular to the longitudinal direction, and both the cells that are sealed and the cells that are open at one end surface of the honeycomb calcined bodies may have the same area for cross sections perpendicular to the longitudinal direction of the cells.

In a honeycomb filter according to an embodiment of the present invention, the ceramic honeycomb substrate (ceramic block) may be formed from a single honeycomb calcined body.

This type of honeycomb filter formed from a single honeycomb calcined body is also called an integrated type honeycomb filter. Cordierite or aluminum titanate or the like can be used as the main constituent material of an integrated type honeycomb filter.

In a honeycomb filter according to an embodiment of the present invention, the shape of the cross section of each cell of a honeycomb calcined body in a direction perpendicular to the longitudinal direction of the honeycomb calcined body is not limited to a substantially tetragonal shape, and can be an arbitrary shape such as a substantially circular shape, substantially elliptical shape, substantially pentagonal shape, substantially hexagonal shape, substantially trapezoidal shape, or substantially octagonal shape. Further, a mixture of various shapes may also be used.

In the honeycomb filter of the present invention, the essential structural elements are that the filter layer is formed on the surface of the cell walls of the ceramic honeycomb substrate, that a portion of the filter layer penetrates from the surface of the cell walls into pores formed by the ceramic particles, thereby forming inter-particle filtration bodies, and that the inter-particle filtration bodies are formed from a plurality of spherical ceramic particles and crosslinking bodies, with the spherical ceramic particles and the crosslinking bodies forming a three-dimensional network structure.

By appropriate combination of these essential structural elements with the various configurations described in the first embodiment and the other embodiments (for example, the structure of the filter layer, the structure of the inter-particle filtration bodies, the methods for forming the filter layer and the inter-particle filtration bodies, the cell structure of the honeycomb calcined bodies, and the honeycomb filter production steps and the like), the desired effects can be obtained.

DESCRIPTION OF THE REFERENCE NUMERALS

1 Carrier gas inflow device
2A, 2B, 12 Spherical ceramic particles
3A Crosslinking body
11 Droplets
100 Honeycomb filter
103 Ceramic honeycomb substrate (ceramic block)
110, 120, 130, 140 Honeycomb calcined body
111a, 111b, 121a, 121b, 131a, 131b, 141a, 141b Cell
113 Cell wall
115 Filter layer
116 Ceramic particle
117 Pore formed by ceramic particles
118 Inter-particle filtration body
F Carrier gas
$G_1$ Exhaust gas

The invention claimed is:

1. A honeycomb filter comprising:
a ceramic honeycomb substrate in which a multitude of cells through which a fluid flows are disposed in parallel in a longitudinal direction and are separated by cell walls, each cell being sealed at an end section at either a fluid inlet side or a fluid outlet side, and
a filter layer which, among surfaces of the cell walls, is formed on a surface of the cell walls of those cells in which the end section at the fluid inlet side is open and the end section at the fluid outlet side is sealed, wherein
the ceramic honeycomb substrate is formed from a porous body of sintered ceramic particles, a portion of the filter layer penetrates from the surface of the cell walls into pores formed by the ceramic particles, thereby forming inter-particle filtration bodies,
the inter-particle filtration bodies are formed from a plurality of spherical ceramic particles and crosslinking bodies which bind the spherical ceramic particles to each other by crosslinking the spherical ceramic particles, with the spherical ceramic particles and the crosslinking bodies forming a three-dimensional network structure, and
an average pore size of pores within the inter-particle filtration bodies is larger than an average particle size of the spherical ceramic particles.

2. The honeycomb filter according to claim 1, wherein the inter-particle filtration bodies penetrate 5 to 50 μm from the surface of the cell walls.

3. The honeycomb filter according to claim 1, wherein the average particle size of the spherical ceramic particles is from 0.2 to 1.2 μm.

4. The honeycomb filter according to claim 1, wherein the average pore size of pores within the inter-particle filtration bodies is from 0.2 to 1.2 μm.

5. The honeycomb filter according to claim 1, wherein a porosity of the ceramic honeycomb substrate is from 55 to 70%.

6. The honeycomb filter according to claim 1, wherein the spherical ceramic particles are heat-resistant oxide ceramic particles.

7. The honeycomb filter according to claim 6, wherein the heat-resistant oxide ceramic particles are at least one type selected from the group consisting of alumina, silica, mullite, ceria, zirconia, cordierite, zeolite, and titania.

8. The honeycomb filter according to claim 1, wherein the ceramic honeycomb substrate comprises silicon carbide or a silicon-containing silicon carbide.

9. The honeycomb filter according to claim 1, wherein the cells that constitute the ceramic honeycomb substrate comprise large volume cells and small volume cells, and
a cross-sectional area of a cross section perpendicular to a longitudinal direction of the large volume cells is larger than a cross-sectional area of a cross section perpendicular to a longitudinal direction of the small volume cells.

10. The honeycomb filter according to claim 9, wherein a shape of the cross section perpendicular to the longitudinal direction of the large volume cells is substantially octagonal, and a shape of the cross section perpendicular to the longitudinal direction of the small volume cells is substantially tetragonal.

11. The honeycomb filter according to claim 9, wherein a shape of the cross section perpendicular to the longitudinal direction of the large volume cells is substantially tetragonal, and a shape of the cross section perpendicular to the longitudinal direction of the small volume cells is substantially tetragonal.

12. The honeycomb filter according to claim 9, wherein a shape of the cross section perpendicular to the longitudinal direction of the large volume cells is substantially hexagonal, and a shape of the cross section perpendicular to the longitudinal direction of the small volume cells is substantially hexagonal.

13. A honeycomb filter comprising:
- a ceramic honeycomb substrate in which a multitude of cells through which a fluid flows are disposed in parallel in a longitudinal direction and are separated by cell walls, each cell being sealed at an end section at either a fluid inlet side or a fluid outlet side, and
- a filter layer which, among surfaces of the cell walls, is formed on a surface of the cell walls of those cells in which the end section at the fluid inlet side is open and the end section at the fluid outlet side is sealed, wherein the ceramic honeycomb substrate is formed from a porous body of sintered ceramic particles, a portion of the filter layer penetrates from the surface of the cell walls into pores formed by the ceramic particles, thereby forming inter-particle filtration bodies, the inter-particle filtration bodies are formed from a plurality of spherical ceramic particles and crosslinking bodies which bind the spherical ceramic particles to each other by crosslinking the spherical ceramic particles, with the spherical ceramic particles and the crosslinking bodies forming a three-dimensional network structure, and an average pore size of pores within the inter-particle filtration bodies is from 0.2 to 1.2 µm.

\* \* \* \* \*